(12) United States Patent
Nishimoto et al.

(10) Patent No.: US 8,147,977 B2
(45) Date of Patent: Apr. 3, 2012

(54) THERMOPLASTIC RESIN COMPOSITION AND COMPOSITE MOLDED PRODUCT

(75) Inventors: Kazuo Nishimoto, Ube (JP); Katsuya Furushige, Ube (JP); Koji Hirata, Ube (JP); Yoshito Nagao, Ube (JP)

(73) Assignee: UMG ABS, Ltd., Tokyo (JP)

( * ) Notice: Subject to any disclaimer, the term of this patent is extended or adjusted under 35 U.S.C. 154(b) by 680 days.

(21) Appl. No.: 12/227,064

(22) PCT Filed: May 8, 2007

(86) PCT No.: PCT/JP2007/059484
§ 371 (c)(1), (2), (4) Date: Nov. 6, 2008

(87) PCT Pub. No.: WO2007/135852
PCT Pub. Date: Nov. 29, 2007

(65) Prior Publication Data
US 2009/0110943 A1   Apr. 30, 2009

(30) Foreign Application Priority Data
May 19, 2006  (JP) ................. 2006-140493

(51) Int. Cl.
*B32B 27/08* (2006.01)
*C08L 33/18* (2006.01)
*C08L 33/04* (2006.01)
*C08L 31/00* (2006.01)
*C08L 35/02* (2006.01)
*C08L 83/00* (2006.01)
*C08G 63/48* (2006.01)

(52) U.S. Cl. ............ 428/515; 525/238; 525/70; 525/85; 525/222; 525/94; 525/71; 523/201

(58) Field of Classification Search ................. 428/515; 525/238, 70, 85, 222, 94, 71; 523/201
See application file for complete search history.

(56) References Cited

U.S. PATENT DOCUMENTS
6,335,399 B1 *  1/2002  Nishimoto et al. ............. 525/71

FOREIGN PATENT DOCUMENTS

| JP | S63-115739 | 5/1988 |
|---|---|---|
| JP | H05-222256 | 8/1993 |
| JP | H05-320462 | 12/1993 |
| JP | H06-157852 | 6/1994 |
| JP | H07-228750 | 8/1995 |
| JP | H09-241452 | 9/1997 |
| JP | 2000-303743 | 10/2000 |
| JP | 2004-204064 | 7/2004 |

* cited by examiner

*Primary Examiner* — William Cheung
(74) *Attorney, Agent, or Firm* — Manabu Kanesaka

(57) ABSTRACT

A thermoplastic resin composition that includes 100 parts by mass of a first vinyl (co)polymer (I) that is produced by (co)polymerization of at least one monomer component selected from the group consisting of aromatic vinyl compounds, vinyl cyanide compounds, and other vinyl monomers copolymerizable with these compounds, and 1 to 100 parts by mass of a vinyl copolymer (II) that is produced by copolymerization of a vinyl cyanide compound and another vinyl monomer copolymerizable with the vinyl cyanide compound and in which the content of the vinyl cyanide compound component in an acetone soluble fraction of the copolymer ranges from 0.1% to 15% by mass.

11 Claims, No Drawings

US 8,147,977 B2

THERMOPLASTIC RESIN COMPOSITION AND COMPOSITE MOLDED PRODUCT

This application is a PCT International Application of PCT/JP2007/059484 filed May 8, 2007, which claims priority to Japanese Patent Application No. 2006-140493 filed May 19, 2006.

TECHNICAL FIELD

The present invention relates to a thermoplastic resin composition and a composite molded product.

BACKGROUND ART

A poly(vinyl chloride) resin or a poly(vinyl chloride) resin filled with filler is sometimes used as a base material resin of a composite construction material in which a synthetic-resin surface layer material and the base material are layered. The surface layer material may be a resin of the same type as the poly(vinyl chloride) resin or a resin that is of a different type from the poly(vinyl chloride) resin but that adheres strongly to the poly(vinyl chloride) resin, for example, an ABS resin or an acrylic resin.

A styrene thermoplastic resin, such as an ABS resin or a PS resin, that has extrusion conditions relatively close to those of the poly(vinyl chloride) resin may be used in place of the poly(vinyl chloride) resin. The PS resin has excellent processibility, foam moldability, and appearance, and is inexpensive.

However, the PS resin has poor weatherability and low chemical resistance and is therefore unsuitable for a surface layer material (designed surface).

The ABS resin has excellent weatherability and high chemical resistance, as well as excellent processibility and appearance, but is more expensive than the PS resin.

Patent Document 1 describes a composite material that includes, as a base material resin (non-designed surface side), an inexpensive PS resin material having excellent foam moldability and a high-functionality ABS resin as a surface layer material (designed surface side). However, common coextruded ABS/PS composite products have the following disadvantages i) to v):

i) a product may get chipped (hereinafter referred to as "chipping") in a cutting process during manufacture;

ii) a base material layer and a surface layer are likely to have insufficient adhesion therebetween, causing delamination in manufacturing processes;

iii) i) and ii) cause defective products, thus reducing the manufacturing yield;

iv) the durability of a product may be impaired by delamination between a base material layer and a surface layer during the use of the product; and v) a surface layer of a molded product is susceptible to scratching during transfer.

Patent Document 2 describes incorporation of a waste resin or the like into a base material resin. The base material resin containing the waste resin tends to worsen the problems described above.

[Patent Document 1] Japanese Unexamined Patent Application Publication No. 63-115739
[Patent Document 2] Japanese Unexamined Patent Application Publication No. 2000-303743

DISCLOSURE OF INVENTION

Problems to be Solved by the Invention

It is an object of the present invention to solve the above-mentioned problems in the related art, to provide a thermoplastic resin composition that has high chemical resistance, excellent appearance of a molded product thereof, and good adhesion to a base material resin, and to provide a composite molded product including a surface layer material of the thermoplastic resin composition.

Means for Solving the Problems

A thermoplastic resin composition according to the present invention includes 100 parts by mass of a first vinyl (co)polymer (I) that is produced by (co)polymerization of at least one monomer component selected from the group consisting of aromatic vinyl compounds, vinyl cyanide compounds, and other vinyl monomers copolymerizable with these compounds, and 1 to 100 parts by mass of a second vinyl copolymer (II) that is produced by copolymerization of a vinyl cyanide compound and another vinyl monomer copolymerizable with the vinyl cyanide compound and in which the content of the vinyl cyanide compound component in an acetone soluble fraction of the copolymer ranges from 0.1% to 15% by mass.

A composite molded product according to the present invention includes a surface layer material containing a thermoplastic resin composition according to the present invention and a base material containing another resin, the composite molded product being manufactured by coextrusion or coinjection molding.

A thermoplastic resin composition according to a first aspect includes 100 parts by mass of a first vinyl (co)polymer (I) that is produced by (co)polymerization of at least one monomer component selected from the group consisting of aromatic vinyl compounds, vinyl cyanide compounds, and other vinyl monomers copolymerizable with these compounds, and 1 to 100 parts by mass of a second vinyl copolymer (II) that is produced by copolymerization of a vinyl cyanide compound and another vinyl monomer copolymerizable with the vinyl cyanide compound and in which the content of the vinyl cyanide compound component in an acetone soluble fraction of the copolymer ranges from 0.1% to 15% by mass.

According to a second aspect, in the thermoplastic resin composition according to the first aspect, the first vinyl (co) polymer (I) includes a (co)polymer (B) produced by (co) polymerization of the at least one monomer component in the absence of a rubber polymer.

According to a third aspect, in the thermoplastic resin composition according to the second aspect, the at least one monomer component in the (co)polymer (B) is styrene, styrene and acrylonitrile, α-methylstyrene and acrylonitrile, methyl methacrylate, styrene and methyl methacrylate, or methyl methacrylate and methyl acrylate.

According to a fourth aspect, in the thermoplastic resin composition according to any one of the first to third aspects, the first vinyl (co)polymer (I) includes a graft (co)polymer (A) produced by (co)polymerization of the at least one monomer component in the presence of a rubber polymer.

According to a fifth aspect, in the thermoplastic resin composition according to the fourth aspect, the content of the rubber polymer in the graft (co)polymer (A) ranges from 5% to 70% by mass.

According to a sixth aspect, in the thermoplastic resin composition according to the fourth or fifth aspect, the at least one monomer component in the graft (co)polymer (A) is styrene, styrene and acrylonitrile, α-methylstyrene and acrylonitrile, methyl methacrylate, or styrene and methyl methacrylate.

According to a seventh aspect, in the thermoplastic resin composition according to any one of the first to sixth aspects, the second vinyl copolymer (II) is a copolymer of acrylonitrile and/or methacrylonitrile and one or at least two selected from the group consisting of styrene, α-methylstyrene, and methyl methacrylate.

According to an eighth aspect, in the thermoplastic resin composition according to any one of the first to seventh aspects, the second vinyl copolymer (II) includes a rubber polymer, and the content of the second vinyl copolymer (II) in the thermoplastic resin composition ranges from 5 to 70 parts by mass per 100 parts by mass of the first vinyl (co)polymer (I).

According to a ninth aspect, in the thermoplastic resin composition according to any one of the first to seventh aspects, the second vinyl copolymer (II) includes no rubber polymer, and the content of the second vinyl copolymer (II) in the thermoplastic resin composition ranges from 3 to 70 parts by mass per 100 parts by mass of the first vinyl (co)polymer (I).

According to a tenth aspect, the thermoplastic resin composition according to any one of the first to ninth aspects further includes 1 to 30 parts by mass of styrene-methyl methacrylate block copolymer (III) per 100 parts by mass of the first vinyl (co)polymer (I).

According to an eleventh aspect, in the thermoplastic resin composition according to any one of the first to tenth aspects, the thermoplastic resin composition is used with another resin in coextrusion or coinjection molding.

According to a twelfth aspect, in the thermoplastic resin composition according to the eleventh aspect, the other resin includes one or at least two selected from the group consisting of PS resins, HIPS resins, waste PS resins, and waste HIPS resins.

A composite molded product according to a thirteenth aspect includes a surface layer material of the thermoplastic resin composition according to any one of the first to twelfth aspects and a base material resin of another resin, the composite molded product being manufactured by coextrusion or coinjection molding.

According to a fourteenth aspect, in the composite molded product according to the thirteenth aspect, the base material resin includes one or at least two selected from the group consisting of PS resins, HIPS resins, waste PS resins, and waste HIPS resins.

A thermoplastic resin composition according to the present invention has excellent appearance of a molded product thereof, high chemical resistance, excellent cutting properties, and good adhesion (fusion) to PS resins, waste PS resins, and the like. The thermoplastic resin composition can therefore be suitably used as a surface layer material of a composite molded product including a base material resin of a PS resin, a waste PS resin, or the like.

A composite molded product according to the present invention that includes a surface layer material of such a thermoplastic resin composition can be suitably used as a composite construction material in various components, such as exterior components and interior components.

Embodiments of a thermoplastic resin composition and a composite molded product according to the present invention will be described in detail below.

The term "(co)polymerization", as used herein, refers to "polymerization and/or copolymerization". Thus, the term "(co)polymer", as used herein, refers to "one or both of a polymer and a copolymer".

Methods for determining the content of a vinyl cyanide compound in an acetone soluble fraction of a copolymer and the mass-average molecular mass thereof are described below.

<Content of Vinyl Cyanide Compound in Acetone Soluble Fraction>

A copolymer immersed in acetone overnight is solved in an ultrasonic cleaner for 30 minutes and is centrifuged at 30,000 rpm for one hour to separate a soluble fraction and an insoluble fraction. The soluble fraction is then concentrated and reprecipitated from methanol to yield another soluble fraction.

The content of a vinyl cyanide compound in the resulting soluble fraction can be determined with any analyzer, including pyrolysis-gas chromatograph. A plurality of analyzers may be used in combination.

<Measurement of Mass-Average Molecular Mass>

As described above, an acetone soluble fraction is separated, dried, and dissolved in tetrahydrofuran (hereinafter referred to as "THF"). The standard-polystyrene equivalent molecular mass is measured by gel permeation chromatography (GPC).

The average particle size of a rubber polymer before graft polymerization can be determined by an optical method. The average particle size of a rubber polymer after graft polymerization can be determined with a transmission electron microscope (TEM) after the rubber polymer is stained with a stain.

[Thermoplastic Resin Composition]

A thermoplastic resin composition according to the present invention includes a first vinyl (co)polymer (I) and a second vinyl copolymer (II) at a predetermined ratio and more preferably includes a predetermined amount of styrene-methyl methacrylate block copolymer.

<First Vinyl (Co)Polymer (I)>

The first vinyl (co)polymer (I) used in the present invention is produced by (co)polymerization, in the presence or absence of a rubber polymer, of at least one monomer component selected from the group consisting of aromatic vinyl compounds, vinyl cyanide compounds, and other vinyl monomers copolymerizable with these compounds.

The copolymer produced in the presence of a rubber polymer is hereinafter referred to as a graft copolymer (A), and the (co)polymer produced in the absence of a rubber polymer is hereinafter referred to as a (co)polymer (B).

Graft Copolymer (A)

Examples of the rubber polymer for use in the graft copolymer (A) include polybutadiene, conjugated diene copolymers, such as copolymers of butadiene and a vinyl monomer copolymerizable with butadiene, acrylate (co)polymers, acrylate copolymers, such as copolymers of an acrylate and a vinyl monomer copolymerizable with the acrylate, ethylene-propylene or butene (preferably propylene)-nonconjugated diene terpolymers, and polyorganosiloxane (co)polymers.

The term "polybutadiene", as used herein, includes cis and trans structures. The conjugated diene copolymers, such as copolymers of polybutadiene and a vinyl monomer copolymerizable with butadiene, include styrene-butadiene copolymer rubber (SBR) and acrylonitrile-butadiene copolymer rubber (NBR).

Examples of acrylate in the acrylate (co)polymers include methyl acrylate, ethyl acrylate, propyl acrylate, butyl acrylate, isobutyl acrylate, pentyl acrylate, isoamyl acrylate, n-hexyl acrylate, 2-methylpentyl acrylate, 2-ethylhexyl acrylate, and n-octyl acrylate.

Examples of diene in the ethylene-propylene or butene-nonconjugated diene terpolymers include dicyclopentadiene, 1,4-hexadiene, 1,4-heptadiene, 1,5-cyclooctadiene, 6-methyl-1,5-heptadiene, 11-ethyl-1,11-tridecadiene, and 5-methylene-2-norbornene.

The polyorganosiloxane (co)polymers include silicone rubber.

The rubber polymer may be composed of one or at least two of these components or may be composite rubber.

Furthermore, the rubber polymer may have a core/shell structure. For example, the rubber polymer may be a rubber polymer composed of a polybutadiene core and an acrylate shell.

Preferably, the average particle size of the rubber polymer ranges from 0.08 to 2 μm and particularly from 0.12 to 0.5 μm.

The content of the rubber polymer in the graft copolymer (A) ranges preferably from 5% to 70% by mass, more preferably from 10% to 50% by mass, and still more preferably from 15% to 40% by mass. The content of the rubber polymer below 5% by mass may result in low impact resistance, while the content of the rubber polymer above 70% by mass may worsen the extrusion moldability.

Examples of an aromatic vinyl compound of the vinyl monomer for use in the graft copolymer (A) include styrene, t-butylstyrene, α-methylstyrene, p-methylstyrene, divinylbenzene, 1,1-diphenylstyrene, N,N-diethyl-p-aminoethylstyrene, N,N-diethyl-p-aminomethylstyrene, vinylpyridine, vinylxylene, monochlorostyrene, dichlorostyrene, monobromostyrene, dibromostyrene, tribromostyrene, fluorostyrene, and vinylnaphthalene. Styrene and α-methylstyrene are preferred.

Examples of a vinyl cyanide compound include acrylonitrile and methacrylonitrile. Acrylonitrile is preferred.

Examples of another vinyl monomer copolymerizable with these compounds include acrylates, such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate; methacrylates, such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate; unsaturated acid anhydrides, such as maleic anhydride, itaconic anhydride, and citraconic anhydride; unsaturated acids, such as acrylic acid and methacrylic acid; imide compounds of α- or β-unsaturated dicarboxylic acids (also referred to as maleimide monomers), such as maleimide, N-methylmaleimide, N-butylmaleimide, N-(p-methylphenyl)maleimide, N-phenylmaleimide, and N-cyclohexylmaleimide; epoxy compounds, such as glycidyl methacrylate and allyl glycidyl ether; unsaturated carboxylic acid amides, such as acrylamide and methacrylamide; unsaturated compounds containing an amino group, such as acrylamine, aminomethyl methacrylate, aminoethyl methacrylate, aminopropyl methacrylate, and aminostyrene; unsaturated compounds containing a hydroxyl group, such as 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, and 2-hydroxyethyl methacrylate; and unsaturated compounds containing an oxazoline group, such as vinyloxazoline.

The aromatic vinyl compounds, the vinyl cyanide compounds, and other vinyl monomers copolymerizable with these compounds may be used alone or in combination.

Preferably, a combination of the vinyl monomers for use in the graft copolymer (A) is, in particular, styrene, styrene/acrylonitrile, α-methylstyrene/acrylonitrile, methyl methacrylate, or styrene/methyl methacrylate.

The content of the vinyl monomer component in the graft copolymer (A) ranges from 95% to 30% by mass, preferably from 90% to 40% by mass, more preferably from 85% to 50% by mass, and most preferably from 85% to 75% by mass. The content of the vinyl monomer above 95% by mass may result in low impact resistance, while the content of the vinyl monomer below 30% by mass may worsen the extrusion moldability.

The graft copolymer (A) can be produced by a known polymerization method, such as emulsion polymerization, suspension polymerization, solution polymerization, or bulk polymerization, or a combination of these methods.

(Co)Polymer (B)

Aromatic vinyl compounds, vinyl cyanide compounds, and other vinyl monomers copolymerizable with these compounds for use in the (co)polymer (B) may be the monomers described above for the graft copolymer (A). These monomers can be used alone or in combination.

Preferably, a combination of the vinyl monomers for use in the (co)polymer (B) is, in particular, styrene, styrene/acrylonitrile, α-methylstyrene/acrylonitrile, methyl methacrylate, styrene/methyl methacrylate, or methyl methacrylate/methyl acrylate.

A vinyl (co)polymer (I) according to the present invention may be a blend of the graft copolymer (A) and the (co)polymer (B). A vinyl (co)polymer (I) according to the present invention may also be a blend of (co)polymers having different compositions or different rubber polymer particle sizes.

The vinyl (co)polymer (I) does not necessarily contain a rubber polymer when used as a surface layer material described below. However, the vinyl (co)polymer (I) preferably contains a rubber polymer in terms of impact resistance or extrusion moldability.

The content of the rubber polymer in the vinyl (co)polymer (I) ranges preferably from 5% to 70% by mass, more preferably from 10% to 50% by mass, and still more preferably from 15% to 40% by mass. The content of the rubber polymer above 70% by mass is not preferred because the extrusion moldability is impaired.

Preferably, the content of the vinyl cyanide compound component in an acetone soluble fraction of the vinyl (co)polymer (I) ranges from 20% to 50% by mass, and the mass-average molecular mass of the vinyl cyanide compound component ranges from 100,000 to 300,000. The content of the vinyl cyanide compound component in an acetone soluble fraction of the vinyl (co)polymer (I) below 20% by mass may result in low chemical resistance, while the content above 50% by mass may result in poor formability, thermal stability, and adhesion to a base material resin. The mass-average molecular mass of the acetone soluble fraction below 100,000 may result in low impact resistance and chipping resistance, while the mass-average molecular mass above 300,000 may result in poor extrusion moldability. The mass-average molecular mass of a vinyl cyanide compound in the acetone soluble fraction can be calculated from analytical values of its components, the graft copolymer (A) and the (co)polymer (B).

<Second Vinyl Copolymer (II)>

The second vinyl copolymer (II) is a copolymer of a vinyl cyanide compound and another vinyl monomer copolymerizable with the vinyl cyanide compound. The content of the vinyl cyanide compound component in an acetone soluble fraction of the second vinyl copolymer (II) ranges from 0.1% to 15% by mass.

Specific examples of the vinyl cyanide compound for use in the vinyl copolymer (II) include acrylonitrile and methacrylonitrile. These vinyl cyanide compounds may be used alone or in combination. In particular, acrylonitrile is preferred.

Examples of another vinyl monomer copolymerizable with the vinyl cyanide compound include aromatic vinyl compounds and other copolymerizable vinyl monomers that are exemplified as vinyl monomers constituting the vinyl (co)polymer (I). In particular, styrene, α-methylstyrene, and methyl methacrylate are preferred. Among others, styrene is suitable. These monomers may be used alone or in combination.

The content of the vinyl cyanide compound component in an acetone soluble fraction of the vinyl copolymer (II) ranges from 0.1% to 15% by mass, more preferably from 1% to 10% by mass, and still more preferably from 2% to 9% by mass. The content of the vinyl cyanide compound component below 0.1% by mass may result in poor dispersion in a blend of the first vinyl (co)polymer (I) and the vinyl copolymer (II). Thus, the resulting thermoplastic resin composition may have poor appearance of a molded product thereof, low chemical resistance, and poor adhesion. The content of the vinyl cyanide compound component above 15% by mass may result in a low adhesive strength between the thermoplastic resin composition and a base material resin and low chipping resistance in a composite molded product containing the vinyl cyanide compound component.

The mass-average molecular mass of the acetone soluble fraction of the second vinyl copolymer (II) ranges preferably from 20,000 to 500,000, more preferably from 30,000 to 400,000, and still more preferably from 50,000 to 200,000. The mass-average molecular mass of the acetone soluble fraction below 20,000 may result in low impact resistance of the resulting thermoplastic resin composition or a low adhesive strength between the thermoplastic resin composition and a base material resin. The mass-average molecular mass of the acetone soluble fraction above 500,000 may result in poor appearance of a molded product thereof or a low adhesive strength between the thermoplastic resin composition and a base material resin in a composite molded product including the thermoplastic resin composition.

The second vinyl copolymer (II) may contain any component provided that the content of a vinyl cyanide compound in the acetone soluble fraction of the second vinyl copolymer (II) ranges from 0.1% to 15% by mass. The second vinyl copolymer (II) optionally contains a rubber polymer.

Examples of the rubber polymer optionally contained in the second vinyl copolymer (II) include the rubber polymers described above for the graft copolymer (A). These rubber polymers may be used alone or as composite rubber of at least two of the rubber polymers.

Preferably, the average particle size of the rubber polymer ranges from 0.08 to 2 μm and particularly from 0.12 to 0.5 μm.

When the vinyl copolymer (II) contains a rubber polymer, the content of the rubber polymer in the vinyl copolymer (II) is 80% by mass or less, preferably in the range of 10% to 80% by mass, more preferably in the range of 30% to 60% by mass, and still more preferably in the range of 35% to 55% by mass. The content of the rubber polymer below 10% by mass may result in low chipping resistance, while the content of the rubber polymer above 80% by mass may result in poor adhesion to a base material resin.

The amount of vinyl copolymer (II) in a thermoplastic resin composition according to the present invention ranges from 1 to 100 parts by mass per 100 parts by mass of the vinyl (co)polymer (I). The amount of vinyl copolymer (II) above 100 parts by mass unfavorably causes deterioration in extrusion moldability, which is a characteristic of the vinyl (co)polymer (I). On the other hand, when the amount of vinyl copolymer (II) is less than 1 part by mass, the thermoplastic resin composition may have poor adhesion to a base material resin and may be susceptible to the influence of environment, thus having low durability.

When the vinyl copolymer (II) contains a rubber polymer, the amount of the vinyl copolymer (II) containing a rubber polymer in a thermoplastic resin composition according to the present invention ranges preferably from 5 to 70 parts by mass, more preferably from 10 to 60 parts by mass, and most preferably from 10 to 40 parts by mass per 100 parts by mass of the vinyl (co)polymer (I). The amount of the vinyl copolymer (II) within such ranges results in an increase in adhesion.

When the vinyl copolymer (II) contains no rubber polymer, the amount of the vinyl copolymer (II) containing no rubber polymer in a thermoplastic resin composition according to the present invention ranges preferably from 3 to 70 parts by mass, more preferably from 5 to 50 parts by mass, and most preferably from 6 to 30 parts by mass per 100 parts by mass of the vinyl (co)polymer (I). The amount of the vinyl copolymer (II) within such ranges results in an increase in adhesion.

In a combination of the vinyl copolymer (II) containing a rubber polymer and the vinyl copolymer (II) containing no rubber polymer or a combination of vinyl copolymers (II) having different rubber polymer contents, preferably, the total content of rubber polymer in the vinyl copolymers (II) ranges from 0.1 to 80 parts by mass and particularly from 0.35 to 55 parts by mass per 100 parts by mass of the vinyl (co)polymer (I).

While the vinyl copolymer (II) may contain a rubber polymer, as described above, the vinyl copolymer (II) preferably contains no rubber polymer. This is because the thermoplastic resin composition can have excellent adhesion at a reduced content of the vinyl copolymer (II). Thus, the performance of the vinyl copolymer (I) as a skin material, for example, chemical resistance, chipping resistance, and scratch resistance, can be more efficiently delivered. The thermoplastic resin composition also has excellent weatherability.

The second vinyl copolymer (II) can be produced by a known polymerization method, such as emulsion polymerization, suspension polymerization, solution polymerization, or bulk polymerization, or a combination of these methods.

<Styrene-Methyl Methacrylate Block Copolymer (III)>

A styrene-methyl methacrylate block copolymer (III) used in the present invention is preferably an A-B block copolymer having styrene as the A segment and methyl methacrylate as the B segment in which the mass ratio of the A segment to the B segment ranges preferably from 10/90 to 99/1 and more preferably from 80/20 to 95/5.

When a thermoplastic resin composition according to the present invention contains the styrene-methyl methacrylate block copolymer (III), its content ranges preferably from 1 to 30 parts by mass and more preferably from 5 to 25 parts by mass per 100 parts by mass of the first vinyl (co)polymer (I). The content of the styrene-methyl methacrylate block copolymer (III) above 30 parts by mass unfavorably results in low impact resistance of the resulting thermoplastic resin composition. On the other hand, when the content of the styrene-methyl methacrylate block copolymer (III) is below 1 part by mass, it may be difficult to further improve the adhesive strength between the thermoplastic resin composition and a base material resin by the addition of the styrene-methyl methacrylate block copolymer (III).

<Other Components>

A thermoplastic resin composition according to the present invention can further contain various additive agents and another resin. In this case, various additive agents include one or at least two selected from the group consisting of known antioxidants, light stabilizers, ultraviolet absorbers, lubricants, plasticizers, stabilizers, mold-release agents, antistatic agents, coloring agents (pigments, dyes, etc.), carbon fiber, glass fiber, fillers, such as wollastonite, calcium carbonate, and silica, flame retardants, bromine-containing flame retardants, flame retardant aids, such as antimony trioxide, phosphorus-containing flame retardants, anti-dripping agents, such as fluorocarbon resins, antimicrobial agents, fungicides, silicone oil, and coupling agents.

Examples of another resin include rubber-reinforced styrene resins, such as a high-impact polystyrene (HIPS) resin, an ABS resin, an ASA resin, an AES resin, and a poly(vinyl chloride) resin, an AS resin, a PS resin, a polycarbonate resin, a poly(butylene terephthalate) resin, a poly(ethylene terephthalate) resin, a polyacetal resin, a nylon resin, a methacrylate resin (PMMA resin), a polypropylene resin, a poly(vinyl chloride) resin, a poly(phenylene ether) resin, a poly(lactic acid) resin, polysulfone, polyetherketone, polyethersulfone, fluorocarbon resins, silicone resins, polyethylene, polyester elastomers, polycaprolactone, aromatic polyester elastomers, polyamide elastomers, polyethylene waxes, such as AS graft polyethylene and AS graft polypropylene, hydrogenated polybutadiene, and hydrogenated copolymers of at least one styrene polymer block and at least one butadiene polymer block. Other resins may be a blend of at least two of these resins. These resins may be modified by a compatibilizer or a functional group.

<Production Method>

In the production of a thermoplastic resin composition according to the present invention, the compounding and melt extrusion of the aforementioned components may be performed by any method, including known methods. For example, kneading in a mixer, such as Brabender or a Henschel mixer, or an extruder, such as a Banbury mixer, a single-screw extruder, or a twin-screw extruder, may be used. Among others, production with a vented twin-screw extruder is preferred.

<Applications>

A thermoplastic resin composition according to the present invention thus produced can be suitably used as a surface layer material of a composite molded product according to the present invention described below and can also be suitably used in extrusion molding or injection molding of the thermoplastic resin composition alone.

[Composite Molded Product]

A composite molded product according to the present invention is manufactured by coextrusion or coinjection molding of a thermoplastic resin composition according to the present invention and another resin such that the thermoplastic resin composition constitutes a surface layer material and the other resin constitutes a base material.

<Resin Constituting Base Material>

In a composite molded product according to the present invention, a base material resin may be a PS resin, a HIPS resin, a waste PS resin, and a waste HIPS resin. These resins may be used alone or in combination.

The base material resin may contain various additive agents and another resin (including a waste material thereof) provided that the adhesion between a thermoplastic resin composition according to the present invention and the base material resin is not affected. These various additive agents and another resin may be the aforementioned additive agents and resin that can be added to a thermoplastic resin composition according to the present invention.

Through the reuse of waste materials, resins collected from the market or discarded in various processes may be used as the resins exemplified as the base material resins and other mixable resins. Furthermore, resins that are not used as final products, such as molded products in an early molding stage of a composite molded product according to the present invention or scraps of the final products, may be collected to use as the base material resin.

A base material formed of a base material resin may take any form, for example, a foam, a hollow body, or a solid body.

A foaming agent for use in the foam molding of a base material resin may be of any type. Preferably, the foaming agent is an azo compound, a nitroso compound, a hydrazine derivative, or bicarbonate used alone or in combination. A spreader used to blend foaming agents may be an edible oil, liquid paraffin, or a fatty acid.

<Method for Forming Composite Molded Product>

In a method for manufacturing a composite molded product according to the present invention by coextrusion or coinjection molding of a thermoplastic resin composition according to the present invention and a base material resin, the coextrusion molding is a method in which a surface layer material of the thermoplastic resin composition according to the present invention and the base material resin are shaped by extrusion molding, such as extrusion molding, sheet extrusion molding, or contour extrusion molding, while the surface layer material and the base material resin are in intimate contact with each other.

The coextrusion molding may be performed with a generally known apparatus. While any molding apparatus may be used, a line of an extruder, a die, a sizing die, a cooling bath, a take-off unit, and a winder or a cutting machine may be used. An additional unit generally used in extrusion molding may also be used.

An extruder for use in foam molding may be, but not limited to, a single-screw or twin-screw extruder generally used in extrusion molding. Preferably, the screw diameter (D) is at least 10 mmφ, and the screw length/screw diameter (L/D) is at least 16. The screw design may be, but not limited to, a screw design generally used in extrusion molding and is preferably of a full-flight type. In the formation of a molded foam using an extruder, while the molding conditions depend on the performance of the extruder and the shape of the molded foam, the molding conditions may be general conditions for foam extrusion of a thermoplastic resin. Preferably, the resin temperature ranges from 140° C. to 220° C. and particularly from 150° C. to 200° C.

A thermoplastic resin composition according to the present invention may be extruded to form a surface layer material on a preformed base material while the thermoplastic resin composition and the preformed base material are in intimate contact with each other, thus forming a composite molded product.

In the coinjection molding, a thermoplastic resin composition according to the present invention may be injected in accordance with a common procedure into a metal mold in which a molded product of a base material resin preformed inside or outside the metal mold is placed.

In such molding, a thermoplastic resin composition according to the present invention may be mixed with a patterning material, such as colored pellets of a thermoplastic resin containing a coloring agent, to form a woodgrain pattern or a grained pattern.

[Applications]

Utilizing its excellent characteristics, a thermoplastic resin composition according to the present invention can be used in wide areas, for example, an OA and consumer electronics area, a vehicle and ship area, housing-related areas, such as a furniture and construction materials area, a sanitary area, a toy and sporting goods area, and a sundry goods area. In particular, a thermoplastic resin composition according to the present invention can be used in a composite molded product for use in exterior or interior components or decorations of part of the exterior or interior components.

Specific applications include housing and housing facilities-related parts, such as thresholds, lintels, architraves, doorframes and bay window frames in a bathroom, window frames, furniture, bathrooms, flooring, skirting boards, rails and stiles, wood decks, fences, external walls, roofing materials, and wall materials. Sanitary-related parts include toilet seats, tank covers, clothes boxes, kitchen utensils, washstand-related parts, and bathroom-related parts.

A composite molded product may have a sheet-like, pipe-like, angular, or tubular shape. A composite molded product can be used in various applications, for example, cases, such as personal computer cases, housings for parabolic antennas, VTR parts, television parts, liquid crystal television parts, loudspeaker parts, audio instruments, facsimile parts, copying machine parts, personal computers, printers, displays, CRT displays, notebook computers, mobile phones, PHSs, DVD drives, PD drives, and flexible disk drives, casing members of switches, lighting parts, and exterior parts for vehicles, such as bumpers and fenders.

EXAMPLES

The present invention will be further described below with reference to Synthesis Examples, Examples, and Comparative Examples. However, the present invention is not limited to these Examples within the gist of the present invention.

The term "parts" hereinafter means "parts by mass", and the term "%" means "% by mass".

Methods for determining the content of a vinyl cyanide compound in an acetone soluble fraction of a copolymer, the mass-average molecular mass of the acetone soluble fraction, and the average particle size of a rubber polymer are described below.

<Content of Vinyl Cyanide Compound in Acetone Soluble Fraction>

The content of a vinyl cyanide compound in an acetone soluble fraction of a copolymer produced by the aforementioned method was determined by pyrolyzing the acetone soluble fraction at 590° C. by pyrolysis-gas chromatograph using a pyrolysis apparatus (manufactured by Japan Analytical Industry Co., Ltd.) and gas chromatography (manufactured by Shimadzu Corporation).

<Mass-Average Molecular Mass of Acetone Soluble Fraction>

The mass-average molecular mass of an acetone soluble fraction of a copolymer produced by the aforementioned method was determined by a standard polystyrene (PS) conversion method using gel permeation chromatograph (GPC) (solvent: THF) manufactured by Tosoh Corporation.

<Average Particle Size of Rubber Polymer>

The average particle size of a rubber polymer was determined by dynamic light scattering using Microtrac Model: 9230UPA manufactured by Nikkiso Co., Ltd.

Synthesis Examples 1 to 12

Production of First Vinyl (Co)Polymer (I)

Synthesis Example 1

Production of Graft Copolymer (A-1)

| [Formulation] | |
|---|---|
| Polybutadiene latex | 50 parts (solid content) |
| Styrene (ST) | 35 parts |
| Acrylonitrile (AN) | 15 parts |
| Disproportionated potassium rosinate | 1 part |
| Potassium hydroxide | 0.03 parts |
| Tertiary-dodecyl mercaptan (t-DM) | 0.2 parts |
| Cumene hydroperoxide | 0.3 parts |
| Iron(II) sulfate | 0.007 parts |
| Sodium diphosphate | 0.1 parts |
| Crystalline glucose | 0.3 parts |
| Distilled water | 190 parts |

Distilled water, disproportionated potassium rosinate, potassium hydroxide, and polybutadiene latex (having an average particle size of 0.28 μm and a solid content of 34%) were charged into an autoclave. After heating to 60° C., iron(II) sulfate, sodium diphosphate, and crystalline glucose were charged into the autoclave. ST, AN, t-DM, and cumene hydroperoxide were successively added for two hours while the autoclave was maintained at 60° C. The autoclave was then heated to 70° C. and held at 70° C. for one hour to complete the reaction. An antioxidant was added to the resulting graft copolymer latex. The latex was then coagulated with sulfuric acid, was washed with water, and was dried to yield a graft copolymer (A-1).

The content of a vinyl cyanide compound in an acetone soluble fraction of the graft copolymer (A-1) was 28.2%. The mass-average molecular mass of the acetone soluble fraction of the copolymer was 137,000. The content of a rubber polymer in the copolymer was 49.8%.

Synthesis Example 2

Production of Graft Copolymer (A-2)

A dry powder of graft copolymer (A-2) was produced as in Synthesis Example 1, except that the polybutadiene latex in Synthesis Example 1 was replaced by 50 parts (solid content) of composite rubber (average particle size: 0.32 μm) latex composed of 20 parts of polybutadiene latex and 80 parts of n-butyl acrylate.

The content of a vinyl cyanide compound in an acetone soluble fraction of the graft copolymer (A-2) was 27.2%. The mass-average molecular mass of the acetone soluble fraction of the copolymer was 142,000. The content of a rubber polymer in the copolymer was 48.4%.

Synthesis Example 3

Production of Copolymer (B-1)

A monomer mixture composed of 120 parts of water, 0.002 parts of sodium alkylbenzenesulfonate, 0.5 parts of poly(vinyl alcohol), 0.3 parts of azoisobutylnitrile, 0.5 parts of t-DM, 30 parts of AN, and 70 parts of ST in a nitrogen-purged reactor was heated from a starting temperature of 60° C. to 120° C. over five hours while part of ST was added successively. After the reaction of the monomer at 120° C. for four hours, a polymer was removed as a copolymer (B-1).

The content of a vinyl cyanide compound in an acetone soluble fraction of the copolymer (B-1) was 30.3% by mass. The mass-average molecular mass of the acetone soluble fraction of the copolymer was 167,000.

Synthesis Example 4

Production of Copolymer (B-2)

A copolymer (B-2) was produced by polymerization as in Synthesis Example 3, except that a monomer mixture composed of 98 parts of methyl methacrylate and 2 parts of methyl acrylate was further added as a monomer mixture.

The content of a vinyl cyanide compound in an acetone soluble fraction of the copolymer (B-2) was 0% by mass. The mass-average molecular mass of the acetone soluble fraction of the copolymer was 136,000.

<Production of Second Vinyl Copolymer (II)>

Synthesis Example 5

Production of Copolymer (II-1)

| [Formulation] | |
| --- | --- |
| Polybutadiene latex | 40 parts (solid content) |
| Acrylonitrile (AN) | 8 parts |
| Styrene (ST) | 52 parts |
| Disproportionated potassium rosinate | 1 parts |
| Potassium hydroxide | 0.03 parts |
| Tertiary-dodecyl mercaptan (t-DM) | 0.3 parts |
| Cumene hydroperoxide | 0.3 parts |
| Iron(II) sulfate | 0.007 parts |
| Sodium diphosphate | 0.1 parts |
| Crystalline glucose | 0.3 parts |
| Distilled water | 190 parts |

Distilled water, disproportionated potassium rosinate, potassium hydroxide, and polybutadiene latex (having an average particle size of 0.28 µm and a solid content of 34%) were charged into an autoclave. After heating to 60° C., iron(II) sulfate, sodium diphosphate, and crystalline glucose were charged into the autoclave. ST, AN, t-DM, and cumene hydroperoxide were successively added for two hours while the autoclave was maintained at 60° C. The autoclave was then heated to 70° C. and held at 70° C. for one hour to complete the reaction. An antioxidant was added to the resulting copolymer latex. The latex was then coagulated with sulfuric acid, was washed with water, and was dried to yield a copolymer (II-1).

The content of a vinyl cyanide compound in an acetone soluble fraction of the copolymer (II-1) was 13.1%. The mass-average molecular mass of the acetone soluble fraction of the copolymer was 167,000. The content of a rubber polymer in the copolymer was 40.8%.

Synthesis Example 6

Production of Copolymer (II-2)

A copolymer (II-2) was produced as in Synthesis Example 5, except that 5 parts of acrylonitrile and 55 parts of styrene were used.

The content of a vinyl cyanide compound in an acetone soluble fraction of the graft copolymer (II-2) was 6.4%. The mass-average molecular mass of the acetone soluble fraction of the copolymer was 134,000. The content of a rubber polymer in the copolymer was 41.2%.

Synthesis Example 7

Production of Copolymer (II-3)

A copolymer (II-3) was produced as in Synthesis Example 6, except that the polybutadiene latex in Synthesis Example 6 was replaced by 40 parts (solid content) of poly(butyl acrylate) rubber (average particle size: 0.32 µm) latex.

The content of a vinyl cyanide compound in an acetone soluble fraction of the copolymer (II-3) was 5.6%. The mass-average molecular mass of the acetone soluble fraction of the copolymer was 142,000. The content of a rubber polymer in the copolymer was 40.4%.

Synthesis Example 8

Production of Copolymer (II-4)

A copolymer (II-4) was produced as in Synthesis Example 6, except that the polybutadiene latex in Synthesis Example 6 was replaced by 40 parts (solid content) of ethylene-propylene rubber (average particle size: 0.45 µm) latex.

The content of a vinyl cyanide compound in an acetone soluble fraction of the copolymer (II-4) was 5.8%. The mass-average molecular mass of the acetone soluble fraction of the copolymer was 139,000. The content of a rubber polymer in the copolymer was 40.1%.

Synthesis Example 9

Production of Copolymer (II-5)

A copolymer (II-5) was produced as in Synthesis Example 5, except that 1.2 parts of acrylonitrile and 58.8 parts of styrene were used.

The content of a vinyl cyanide compound in an acetone soluble fraction of the copolymer (II-5) was 2.0%. The mass-average molecular mass of the acetone soluble fraction of the copolymer was 171,000. The content of a rubber polymer in the copolymer was 41.0%.

Synthesis Example 10

Production of Copolymer (II-6)

A copolymer (II-6) was produced as in Synthesis Example 3, except that a monomer mixture of 5 parts of AN and 95 parts of ST in a nitrogen-purged reactor was used while parts of AN and ST were added successively.

The content of a vinyl cyanide compound in an acetone soluble fraction of the copolymer (II-6) was 5.1% by mass. The mass-average molecular mass of the acetone soluble fraction of the copolymer was 179,000.

Synthesis Example 11

Production of Copolymer (II-7)

A copolymer (II-7) was produced as in Synthesis Example 10, except that a monomer mixture of 2 parts of AN and 98 parts of ST was used.

The content of a vinyl cyanide compound in an acetone soluble fraction of the copolymer (II-7) was 2.1% by mass. The mass-average molecular mass of the acetone soluble fraction of the copolymer was 187,000.
<Synthesis of Vinyl Copolymer (II')>

Synthesis Example 12

Production of Copolymer (II-8)

A copolymer (II'-8) was produced as in Synthesis Example 10, except that a monomer mixture of 20 parts of AN and 80 parts of ST in a nitrogen-purged reactor was used while part of ST was added successively during heating.

The content of a vinyl cyanide compound in an acetone soluble fraction of the copolymer (II'-8) was 19.4% by mass. The mass-average molecular mass of the acetone soluble fraction of the copolymer was 168,000.
[Commercially Available Resin]
<Styrene-Methyl Methacrylate Block Copolymer (III)>
Styrene-Methyl Methacrylate Block Copolymer (III-1):
    "Modiper MS10B" manufactured by NOF Corporation
    A-B block copolymer
    A segment: styrene
    B segment: methyl methacrylate
    A segment:B segment=90/10 (mass ratio)<
<Another Resin (IV)>
PS resin (IV-1): "G210B" PS resin manufactured by Toyo Styrene Co., Ltd.

Examples 1 to 21 and Comparative Examples 1 to 5

Production and Evaluation of Thermoplastic Resin Composition

Components shown in Tables 1 and 2 and, as lubricants, 1.0 part of "ethylenebis(stearamide)" manufactured by Kao Corporation and 0.2 parts of "calcium stearate" manufactured by NOF Corporation were mixed, and were melt-blended in a twin-screw extruder ("TEX-30α" manufactured by The Japan Steel Works, Ltd.) at 200° C. to 240° C. to produce pellets of a thermoplastic resin composition.

The sheet appearance, the chemical resistance, and the pencil hardness of the resulting thermoplastic resin composition were evaluated by the following methods. Tables 1 and 2 show the results.
Sheet Appearance A thermoplastic resin composition was extruded to form a sheet (20 cm in width×60 cm in length) having a thickness of 1 mm. The appearance of the sheet was visually inspected.

A sheet having a smooth surface and a satisfactory appearance was judged to be good. A sheet having a rough surface or a granular structure was judged to be poor.

After a sheet was bent lightly, a sheet having no abnormality was judged to be good, and a sheet having an abnormality, such as detachment, was judged to be poor.
Chemical Resistance A thermoplastic resin composition was injected to form a strip specimen (150×10×2 mm). After the specimen was fixed to a bending form test jig, a detergent Magiclean (trade name) manufactured by Kao Corporation was applied to the specimen as a chemical solution. After the specimen was left alone at 23° C. for 48 hours, the specimen was checked for a craze and a crack. The critical strain [%] of the specimen was determined from the curvature of the test jig. A specimen having a critical strain of at least 0.8% was judged to pass the test.

Pencil Hardness

A resin sheet used in Sheet appearance was used for the measurement of pencil hardness according to JIS K-5400. A sheet having an evaluation result of B or harder is preferred, because such a sheet is assumed to be resistant to scratching during transfer.
<Manufacture and Evaluation of Composite Molded Product>

Using, as a surface layer material, a thermoplastic resin composition produced as described above and, as a base material resin, the PS resin (IV-1) containing 0.1 parts of a spreader (liquid paraffin) and 0.5 parts of a foaming agent (sodium hydrogencarbonate) per 100 parts of the PS resin (IV-1), a composite molded product was manufactured by coextrusion molding at an expansion ratio of the base material resin of about 2.

In coextrusion molding, a coextruder included a 40 mm extruder manufactured by Chuo Kikai Co., Ltd. and a 25 mm transfer extruder manufactured by Ikegai Co., equipped with an adapter and a multilayer profile die, a sizing unit, a take-off unit, and a cutting circular saw. The coextrusion molding was performed at a resin temperature in the range of 170° C. to 200° C.

The appearance, the adhesiveness, the chipping resistance, the heat-cycle resistance, and the weatherability of the resulting composite molded product were evaluated by the following methods. Tables 1 and 2 show the results.
Appearance of Molded Product The appearance of a surface layer of a composite molded product was visually inspected. A composite molded product having a smooth surface and a satisfactory appearance was judged to be good. A composite molded product having a rough surface or a granular structure and a defective appearance was judged to be poor.
Adhesiveness A cut 2 cm square was made on a surface layer side (thermoplastic resin composition layer) of a composite molded product. The adhesiveness was evaluated by the difference in the degree of adhesion of an interface between a surface layer material and a base material (PS resin).

As criteria, a composite molded product having detachment (the surface layer material was not adhered to the base material) after molding was judged to be very poor, a composite molded product in which the surface layer material was easily detached from the base material by inserting a nail into the interface was judged to be poor, a composite molded product in which the surface layer material was detached from the base material by inserting a cutter knife-edge into the interface was judged to be fair, a composite molded product free of detachment was judged to be good, and a composite molded product in which the surface layer material was adhered so strongly to the base material that a cutter knife-edge cannot be inserted into the interface was judged to be excellent. Poor represents an insufficient adhesive strength. Good or excellent represents a sufficient adhesive strength, indicating that composite molded product passed the test.
Chipping Resistance A composite molded product was cut perpendicularly to the machine direction with an electric circular saw. A composite molded product free of crack and detachment on the surface layer material in the section was judged to be good. A composite molded product having either a crack or detachment was judged to be fair. A composite molded product having both a crack and detachment was judged to be poor.
Heat-Cycle Properties After a composite molded product was subjected to the following heat-cycle conditions, a surface layer material and a base material were checked for a blister, deformation, and detachment. The composite molded product was evaluated by the criteria described below.

Condtion-1: 10 cycles of −30° C. for one hour→23° C. for 30 min→70° C. for one hour→23° C. for 30 min in a thermostat at a humidity of 40%

Condtion-2: 10 cycles of −30° C. for one hour→23° C. for min→70° C. for one hour→23° C. for 30 min in a thermostat at a humidity of 80%

Good: no blister, no deformation, and no detachment.

Fair: infrequent occurrence of a blister, deformation, or detachment.

Poor: frequent occurrence of a blister, deformation, or detachment.

Weatherability

After a composite molded product was irradiated in a sunshine weatherometer (in the presence of rainfall at a temperature of 63° C.) for 1000 hours, the discoloration (ΔE) was measured. As criteria, a composite molded product can be used indoors at ΔE of 10 or less and outdoors at ΔE of 5 or less. A test specimen having poor adhesiveness in the evaluation of a composite molded product was not worth evaluating the weathering test and was not tested.

TABLE 1

| | Example | | | Working Example | | | | | | |
|---|---|---|---|---|---|---|---|---|---|---|
| | | | | 1 | 2 | 3 | 4 | 5 | 6 | 7 |
| Thermoplastic resin composition (parts) | Vinyl (co)polymer (I) | Graft copolymer | (A-1) | 40 | 40 | 40 | | | | |
| | | | (A-2) | | | | 40 | 40 | 40 | 40 |
| | | | (B-1) | 60 | 60 | 30 | 60 | 60 | | 60 |
| | | | (B-2) | | | 30 | | | 60 | |
| | Vinyl (co)polymer (II) | | (II-1) | 30 | | | 30 | | | |
| | | | (II-2) | | 30 | 30 | | 30 | 30 | 60 |
| | | | (II-3) | | | | | | | |
| | | | (II-4) | | | | | | | |
| | | | (II-5) | | | | | | | |
| | | | (II-6) | | | | | | | |
| | | | (II-7) | | | | | | | |
| | Vinyl (co)polymer (II') | | (II'-8) | | | | | | | |
| | Styrene-methyl methacrylate block copolymer (III) | | (III-1) | | | | | | | |
| | Another resin (IV) | PS resin | (IV-1) | | | | | | | |
| Evaluation of thermoplastic resin composition | Sheet appearance | | | Good | Good | Good | Good | Good | Good | Good |
| | Chemical resistance | | | 1.0 | 0.9 | 0.8 | 1.2 | 1.2 | 1.2 | 1.2 |
| | Pencil hardness | | | 3B | 3B | 3B | 3B | 3B | 2B | 3B |
| Evaluation of composite molded product | Appearance of molded product | | | Good | Good | Good | Good | Good | Good | Good |
| | Adhesiveness | | | Good | Excellent | Excellent | Good | Excellent | Excellent | Good |
| | Chipping resistance | | | Good | Good | Good | Good | Good | Good | Good |
| | Heat-cycle resistance | | Condition-1 | Good | Good | Good | Good | Good | Good | Good |
| | | | Condition-2 | Good | Good | Good | Good | Good | Good | Good |
| | Weathering test result ΔE | | | 9.8 | 9.7 | 8.6 | 6.6 | 6.5 | 6.0 | 7.0 |

| | Example | | | Working Example | | | | | |
|---|---|---|---|---|---|---|---|---|---|
| | | | | 8 | 9 | 10 | 11 | 12 | 13 |
| Thermoplastic resin composition (parts) | Vinyl (co)polymer (I) | Graft copolymer | (A-1) | | | | | | |
| | | | (A-2) | 40 | 40 | 40 | 40 | 40 | 40 |
| | | | (B-1) | 60 | 60 | 60 | 60 | 60 | 60 |
| | | | (B-2) | | | | | | |
| | Vinyl (co)polymer (II) | | (II-1) | | | | 10 | | |
| | | | (II-2) | 15 | 30 | 30 | 10 | | |
| | | | (II-3) | | | | | 30 | |
| | | | (II-4) | | | | | | 30 |
| | | | (II-5) | | | | | | |
| | | | (II-6) | | | | | | |
| | | | (II-7) | | | | | | |
| | Vinyl (co)polymer (II') | | (II'-8) | | | | | | |
| | Styrene-methyl methacrylate block copolymer (III) | | (III-1) | | 20 | | 10 | | |
| | Another resin (IV) | PS resin | (IV-1) | | | 20 | 10 | | |
| Evaluation of thermoplastic resin composition | Sheet appearance | | | Good | Good | Good | Good | Good | Good |
| | Chemical resistance | | | 1.2 | 1.2 | 1.2 | 1.2 | 1.2 | 1.2 |
| | Pencil hardness | | | 3B | 3B | 3B | 3B | 3B | 3B |
| Evaluation of composite molded product | Appearance of molded product | | | Good | Good | Good | Good | Good | Good |
| | Adhesiveness | | | Good | Excellent | Good | Excellent | Excellent | Excellent |
| | Chipping resistance | | | Good | Good | Good | Good | Good | Good |
| | Heat-cycle resistance | | Condition-1 | Good | Good | Good | Good | Good | Good |
| | | | Condition-2 | Good | Good | Good | Good | Good | Good |
| | Weathering test result ΔE | | | 6.8 | 6.8 | 7.3 | 6.4 | 5.5 | 5.4 |

TABLE 2

| | | | | Working Example | | | | | | | |
|---|---|---|---|---|---|---|---|---|---|---|---|
| | Example | | | 14 | 15 | 16 | 17 | 18 | 19 | 20 | 21 |
| Thermoplastic resin composition (parts) | Vinyl (co)polymer (I) | Graft copolymer | (A-1) | | | | | | | | |
| | | | (A-2) | 40 | 40 | 40 | 40 | 40 | 40 | 40 | 40 |
| | | Copolymer | (B-1) | | | | | | | | |
| | | | (B-2) | 60 | 60 | 60 | 60 | 60 | 60 | 60 | 60 |
| | Vinyl (co)polymer (II) | | (II-1) | | | | | | | | |
| | | | (II-2) | | 25 | 40 | | | | | 10 |
| | | | (II-3) | | | | | | | | |
| | | | (II-4) | | | | | | | | |
| | | | (II-5) | | | | | | 30 | | |
| | | | (II-6) | 10 | | | 5 | 50 | | | 10 |
| | | | (II-7) | | | | | | | 10 | |
| | Vinyl (co)polymer (II') | | (II'-8) | | | | | | | | |
| | Styrene-methyl methacrylate block copolymer (III) | | (III-1) | | | | | | | | |
| | Another resin (IV) | PS resin | (IV-1) | | | | | | | | |
| Evaluation of thermoplastic resin composition | Sheet appearance | | | Good | Good | Good | Good | Good | Good | Good | Good |
| | Chemical resistance | | | 1.0 | 1.1 | 1.2 | 1.0 | 0.8 | 1.0 | 1.0 | 1.1 |
| | Pencil hardness | | | HB | 2B | 2B | HB | HB | HB | HB | B |
| Evaluation of composite molded product | Appearance of molded product | | | Good | Good | Good | Good | Good | Good | Good | Good |
| | Adhesiveness | | | Excellent | Excellent | Excellent | Good | Good | Good | Good | Excellent |
| | Chipping resistance | | | Good | Good | Good | Good | Good | Good | Good | Good |
| | Heat-cycle resistance | | Condition-1 | Good | Good | Good | Good | Good | Good | Good | Good |
| | | | Condition-2 | Good | Good | Good | Fair | Fair | Fair | Fair | Good |
| | Weathering test result $\triangle E$ | | | 1.9 | 6.0 | 6.6 | 2.3 | 2.0 | 2.2 | 2.0 | 3.2 |

| | | | | Comparative Example | | | | |
|---|---|---|---|---|---|---|---|---|
| | Example | | | 1 | 2 | 3 | 4 | 5 |
| Thermoplastic resin composition (parts) | Vinyl (co)polymer (I) | Graft copolymer | (A-1) | 40 | | | 40 | 40 |
| | | | (A-2) | | 40 | | | 40 |
| | | Copolymer | (B-1) | 60 | 60 | | | 60 |
| | | | (B-2) | | | 60 | 60 | |
| | Vinyl (co)polymer (II) | | (II-1) | | | | | |
| | | | (II-2) | | | | | |
| | | | (II-3) | | | | | |
| | | | (II-4) | | | | | |
| | | | (II-5) | | | | | |
| | | | (II-6) | | | | | |
| | | | (II-7) | | | | | |
| | Vinyl (co)polymer (II') | | (II'-8) | | | | 10 | |
| | Styrene-methyl methacrylate block copolymer (III) | | (III-1) | 30 | | | | |
| | Another resin (IV) | PS resin | (IV-1) | | 30 | | | 10 |
| Evaluation of thermoplastic resin composition | Sheet appearance | | | Poor | Poor | Good | Good | Poor |
| | Chemical resistance | | | 0.6 | 0.4 | 1.0 | 1.0 | 0.4 |
| | Pencil hardness | | | B | B | HB | HB | B |
| Evaluation of composite molded product | Appearance of molded product | | | Poor | Poor | Good | Good | Poor |
| | Adhesiveness | | | Fair | Fair | Very poor | Poor | Poor |
| | Chipping resistance | | | Fair | Fair | Poor | Fair | Poor |
| | Heat-cycle resistance | | Condition-1 | Poor | Poor | Fair | Poor | Poor |
| | | | Condition-2 | Poor | Poor | Poor | Poor | Poor |
| | Weathering test result $\triangle E$ | | | Not evaluated because of poor adhesiveness | | | | |

[Discussion]

Table 1 shows that the thermoplastic resin compositions of Examples 1 to 21, which comply with the requirements set forth in the Claims of the present invention, had excellent balance between the sheet appearance, the chemical resistance, and the surface hardness. Furthermore, the appearance, the adhesion between the surface layer material and the base material resin, the chipping resistance, the heat-cycle resistance, and the weatherability of a composite molded product including the thermoplastic resin composition were also excellent.

In contrast, the thermoplastic resin compositions of Comparative Examples 1 and 2 had poor sheet appearance and low chemical resistance. Furthermore, the appearance of a molded product thereof, the adhesion between the surface layer material and the base material resin, the chipping resistance, and the heat-cycle resistance were also poor. Thus, the thermoplastic resin compositions of Comparative Examples 1 and 2 are of little practical use. The thermoplastic resin composition (vinyl (co)polymer alone) of Comparative Example 3 had excellent sheet appearance and chemical resistance, but low chipping resistance and heat-cycle resistance. This cannot therefore be used practically. Comparative Example 4, in which the content of a vinyl cyanide compound in an acetone soluble fraction of the copolymer (II-8) was 19.4% by mass, which was outside the scope of the present invention, had excellent sheet appearance and chemical resistance, but poor adhesiveness and low heat-cycle resistance. This cannot therefore be used practically. Comparative Example 5, in which a PS resin was mixed directly, had poor sheet appearance, low chemical resistance, poor adhesiveness, and low heat-cycle resistance. This cannot therefore be used practically.

Industrial Applicability

A thermoplastic resin composition according to the present invention has a high adhesive strength between the thermoplastic resin composition and a base material resin, high chemical resistance, excellent cutting properties, and excellent appearance of a molded product thereof, and therefore can be suitably used as a surface layer material of composite construction materials. Furthermore, a composite molded product according to the present invention can be suitably used as an exterior or interior component particularly in composite construction material applications.

While the present invention was described in detail with particular embodiments, it is apparent to a person skilled in the art that various modifications can be made without departing from the spirit and the scope of the present invention.

The present application is based on Japanese patent application (Japanese patent application No. 2006-140493) filed on May 19, 2006, which is incorporated herein by reference in their entirety.

The invention claimed is:

1. A thermoplastic resin composition comprising:
   100 parts by mass of a first vinyl (co)polymer (I) that is produced by (co)polymerization of at least one monomer component selected from the group consisting of aromatic vinyl compounds, vinyl cyanide compounds, and other vinyl monomers copolymerizable with these compounds; and
   1 to 100 parts by mass of a second vinyl copolymer (II) that is produced by copolymerization of a vinyl cyanide compound and another vinyl monomer copolymerizable with the vinyl cyanide compound and in which the content of the vinyl cyanide compound component in an acetone soluble fraction of the copolymer ranges from 0.1% to 15% by mass,
   wherein the thermoplastic resin composition is used with another resin in coextrusion or coinjection molding, said another resin comprising one or at least two materials selected from the group consisting of PS resins, HIPS resins, waste PS resins, and waste HIPS resins.

2. The thermoplastic resin composition according to claim 1, wherein the first vinyl (co)polymer (I) comprises a (co)polymer (B) produced by (co)polymerization of the at least one monomer component in the absence of a rubber polymer.

3. The thermoplastic resin composition according to claim 2, wherein the at least one monomer component in the (co)polymer (B) is styrene, styrene and acrylonitrile, α-methylstyrene and acrylonitrile, methyl methacrylate, styrene and methyl methacrylate, or methyl methacrylate and methyl acrylate.

4. The thermoplastic resin composition according to claim 1, wherein the first vinyl (co)polymer (I) comprises a graft (co)polymer (A) produced by (co)polymerization of the at least one monomer component in the presence of a rubber polymer.

5. The thermoplastic resin composition according to claim 4, wherein the content of the rubber polymer in the graft (co)polymer (A) ranges from 5% to 70% by mass.

6. The thermoplastic resin composition according to claim 4, wherein the at least one monomer component in the graft (co)polymer (A) is styrene, styrene and acrylonitrile, α-methylstyrene and acrylonitrile, methyl methacrylate, or styrene and methyl methacrylate.

7. The thermoplastic resin composition according to claim 1, wherein the second vinyl copolymer (II) is a copolymer of acrylonitrile and/or methacrylonitrile and one or at least two selected from the group consisting of styrene, α-methylstyrene, and methyl methacrylate.

8. The thermoplastic resin composition according to claim 1, wherein the second vinyl copolymer (II) comprises a rubber polymer, and the content of the second vinyl copolymer (II) in the thermoplastic resin composition ranges from 5 to 70 parts by mass per 100 parts by mass of the first vinyl (co) polymer (I).

9. The thermoplastic resin composition according to claim 1, wherein the second vinyl copolymer (II) comprises no rubber polymer, and the content of the second vinyl copolymer (II) in the thermoplastic resin composition ranges from 3 to 70 parts by mass per 100 parts by mass of the first vinyl (co)polymer (I).

10. A thermoplastic resin composition comprising:
    100 parts by mass of a first vinyl (co)polymer (I) that is produced by (co)polymerization of at least one monomer component selected from the group consisting of aromatic vinyl compounds, vinyl cyanide compounds, and other vinyl monomers copolymerizable with these compounds;
    1 to 100 parts by mass of a second vinyl copolymer (II) that is produced by copolymerization of a vinyl cyanide compound and another vinyl monomer copolymerizable with the vinyl cyanide compound and in which the content of the vinyl cyanide compound component in an acetone soluble fraction of the copolymer ranges from 0.1% to 15% by mass; and
    1 to 30 parts by mass of styrene-methyl methacrylate block copolymer (III).

11. A composite molded product comprising a surface layer material of a thermoplastic resin composition, and a base material of another resin, the composite molded product being manufactured by coextrusion or coinjection molding,
    wherein the thermoplastic resin composition comprises:
    100 parts by mass of a first vinyl (co)polymer (I) that is produced by (co)polymerization of at least one monomer component selected from the group consisting of aromatic vinyl compounds, vinyl cyanide compounds, and other vinyl monomers copolymerizable with these compounds; and
    1 to 100 parts by mass of a second vinyl copolymer (II) that is produced by copolymerization of a vinyl cyanide compound and another vinyl monomer copolymerizable with the vinyl cyanide compound and in which the content of the vinyl cyanide compound component in an acetone soluble fraction of the copolymer ranges from 0.1% to 15% by mass; and
    wherein the resin constituting the base material comprises at least one selected from the group consisting of PS resins, HIPS resins, waste PS resins, and waste HIPS resins.

* * * * *